(12) United States Patent
Hull et al.

(10) Patent No.: US 7,472,661 B2
(45) Date of Patent: Jan. 6, 2009

(54) METHOD OF DELIVERING PLANT SEED MATERIAL

(75) Inventors: John Harrison Hull, Toledo, OH (US); Eric Lawrence Kraus, Waterville, OH (US)

(73) Assignee: Aquablok, Ltd, Toledo, OH (US)

( * ) Notice: Subject to any disclaimer, the term of this patent is extended or adjusted under 35 U.S.C. 154(b) by 353 days.

(21) Appl. No.: 11/157,588

(22) Filed: Jun. 21, 2005

(65) Prior Publication Data

US 2005/0284351 A1 Dec. 29, 2005

Related U.S. Application Data

(60) Provisional application No. 60/582,283, filed on Jun. 23, 2004, provisional application No. 60/582,284, filed on Jun. 23, 2004.

(51) Int. Cl.
*A01B 79/00* (2006.01)
*A01B 79/02* (2006.01)
*A01C 15/00* (2006.01)
*A01G 9/08* (2006.01)
*A01G 9/10* (2006.01)

(52) U.S. Cl. .................. 111/200; 111/900; 111/915; 47/1.01 R; 47/58.1 R; 47/58.1 LS; 47/58.1 SC; 47/58.1 SE; 47/DIG. 6; 47/DIG. 9

(58) Field of Classification Search ............... 111/200, 111/900, 915–919; 47/1.01 R, 58.1 R, 58.1 LS, 47/58.1 SC, 58.1 SE, DIG. 6, DIG. 9
See application file for complete search history.

(56) References Cited

U.S. PATENT DOCUMENTS

| | | | |
|---|---|---|---|
| 2,277,286 A | 3/1942 | Bechtner | |
| 2,728,733 A | 12/1955 | Hashimoto | |
| 4,011,175 A | 3/1977 | Preus | |
| 4,145,206 A | 3/1979 | Ford | |
| 4,172,714 A | 10/1979 | Albert | |
| 4,252,462 A | 2/1981 | Klingle et al. | |
| 4,323,367 A | 4/1982 | Ghosh | |
| 4,541,751 A | 9/1985 | Larsen | |
| 4,668,123 A | 5/1987 | Larsen | |
| 4,688,024 A | 8/1987 | Gadde | |
| 4,790,940 A | 12/1988 | Castaldi et al. | |
| 4,950,426 A | 8/1990 | Markowitz et al. | |
| 4,985,251 A | 1/1991 | Levy | |
| 5,035,804 A | 7/1991 | Stowe | |
| 5,091,234 A | 2/1992 | McGroarty et al. | |
| 5,112,665 A | 5/1992 | Alexander | |
| 5,127,765 A | 7/1992 | Millgard | |
| 5,256,001 A | 10/1993 | Millgard | |
| 5,259,697 A | 11/1993 | Allen et al. | |
| 5,286,140 A | 2/1994 | Mather | |
| 5,458,747 A | 10/1995 | Marks et al. | |

(Continued)

FOREIGN PATENT DOCUMENTS

DE  3908628 A1  9/1990

(Continued)

*Primary Examiner*—Christopher J. Novosad
(74) *Attorney, Agent, or Firm*—Marshall & Melhorn, LLC

(57) ABSTRACT

A method for delivering plant seed material to a target placement surface is described. The method comprises utilizing a core material and combining plant seed material with the core material to create a vector. A plurality of vectors are delivered to a target placement surface but a barrier layer of vectors is not created.

69 Claims, 9 Drawing Sheets

U.S. PATENT DOCUMENTS

| | | |
|---|---|---|
| 5,481,815 A | 1/1996 | Murphy et al. |
| 5,538,787 A | 7/1996 | Nachtman et al. |
| 5,562,586 A | 10/1996 | Hyde-Smith |
| 5,564,862 A | 10/1996 | Markels, Jr. |
| 5,605,416 A | 2/1997 | Roach |
| 5,605,417 A | 2/1997 | Englert et al. |
| 5,700,685 A | 12/1997 | Murphy |
| 5,753,494 A | 5/1998 | Hater et al. |
| 5,857,807 A | 1/1999 | Longo, Sr. |
| 5,857,810 A | 1/1999 | Cantrell et al. |
| 5,861,750 A | 1/1999 | Anderson et al. |
| 5,861,751 A | 1/1999 | Anderson et al. |
| 5,897,946 A | 4/1999 | Nachtman |
| 5,984,580 A | 11/1999 | Ham et al. |
| 6,010,624 A | 1/2000 | Larsen |
| 6,024,513 A | 2/2000 | Hudgins et al. |
| 6,209,259 B1 | 4/2001 | Madigan et al. |
| 6,386,796 B1 | 5/2002 | Hull |
| 6,558,081 B2 | 5/2003 | Hull |

FOREIGN PATENT DOCUMENTS

| | | |
|---|---|---|
| DE | 4137171 A1 | 5/1993 |
| EP | 0059625 | 8/1982 |
| EP | 0567692 A1 | 3/1993 |
| EP | 0543 438 A1 | 5/1993 |
| EP | 0616758 A1 | 9/1994 |
| GB | 1053036 | 12/1966 |
| GB | 1521197 | 8/1978 |
| WO | WO 90/14222 | 11/1990 |

US 7,472,661 B2

METHOD OF DELIVERING PLANT SEED MATERIAL

RELATED APPLICATIONS

This application is claiming the benefit, under 35 U.S.C. §119(e), of the provisional application filed Jun. 23, 2004 under 35 U.S.C. §111(b), which was granted Ser. No. 60/582,283, and the provisional application filed Jun. 23, 2004 under 35 U.S.C. §111(b), which was granted Ser. No. 60/582,284. The provisional applications are hereby incorporated by reference in their entirety.

FIELD OF THE INVENTION

The present invention relates to a method for delivering a vector having plant seed material to a target placement surface such as an inundated target placement surface, a saturated target placement surface and/or to a non-saturated target placement surface so that the vectors do not form a barrier over any surface.

BACKGROUND OF THE INVENTION

Those skilled in the art know vegetation can be introduced to non-saturated areas, saturated areas and inundated areas in generally two ways. Namely, vegetation can be introduced by plug planting and/or seeding. Plug planting is generally defined as the planting of seedlings, cuttings or other established plant materials in a particular area. Seeding is generally defined as broadcasting, drilling, and hydroseeding.

These known methods suffer several disadvantages. First, plug planting and seeding are both expensive in terms of labor and materials. Both methods can become prohibitively expensive particularly for large-scale operations which may be, by way of example, one acre or more. Secondly, particularly with regard to plug planting, the known methods are prohibitively expensive where it is desired to introduce more than a single plant species to an area. Thirdly, particularly with regard to seeding, the known methods do not economically permit the accurate placement of a predetermined quality and/or quantity of plant seed material in a particular area. Seeding is also disadvantageously subject to wind, water and/or other dispersive forces which undesirably move plant seed material from desired locations. Lastly, the known methods, particularly seeding, are disadvantageous since the seeds, buoyant by nature, typically float on top of a water surface when located thereon and do not sink so the seeds can root into a bottom surface.

The prior art also consists of U.S. Pat. Nos. 5,897,946, 6,386,796 and 6,558,081 which describe methods for creating a non-permeable barrier layer over contamination. The patents teach that plant seeds may be included with particles. A plurality of particles, each having a core and fine-grained material located about the core, are non-precisely distributed over the contamination in such a quantity that the particles are heaped upon one another. In one embodiment, the particles form a permanent underwater layer which forms a barrier over the contamination.

In light of at least the disadvantages of the known prior art methods of introducing vegetation to various areas, it would be desirable for a distribution method to be cost effective in terms of both labor and materials particularly for a large area. It would also be desirable to have a method for providing vegetation to a particular area where the method permitted the simultaneous introduction of one or more plant species in a cost effective manner. It would also be advantageous to have a method that permitted the accurate placement of a predetermined quantity of plant seed material over the target area and which maintained the plant seed material where it was placed. It would also be advantageous to have a method of distributing plant seed material to inundated areas where the plant seed material did not float on the top of the water, but instead sank to the bottom of the water. Additionally, it would be desirable for a method of providing vegetation via the distribution of plant seed material to a particular area to not create a barrier as taught in the above-mentioned patents. Such a method may be desirably achieved by causing a portion of the vector carrying the plant seed material to disassociate from the vector.

SUMMARY OF THE INVENTION

The present invention is a method of delivering plant seed material to a target placement surface. The method comprises utilizing a core material comprised of one or more earthen, biological, or manmade materials. A fine-grained material is combined with the core material to utilize the core as a vector for the plant seed material. A plurality of vectors are delivered to the target placement surface, however, the vectors are prevented from forming a barrier over the target placement surface.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
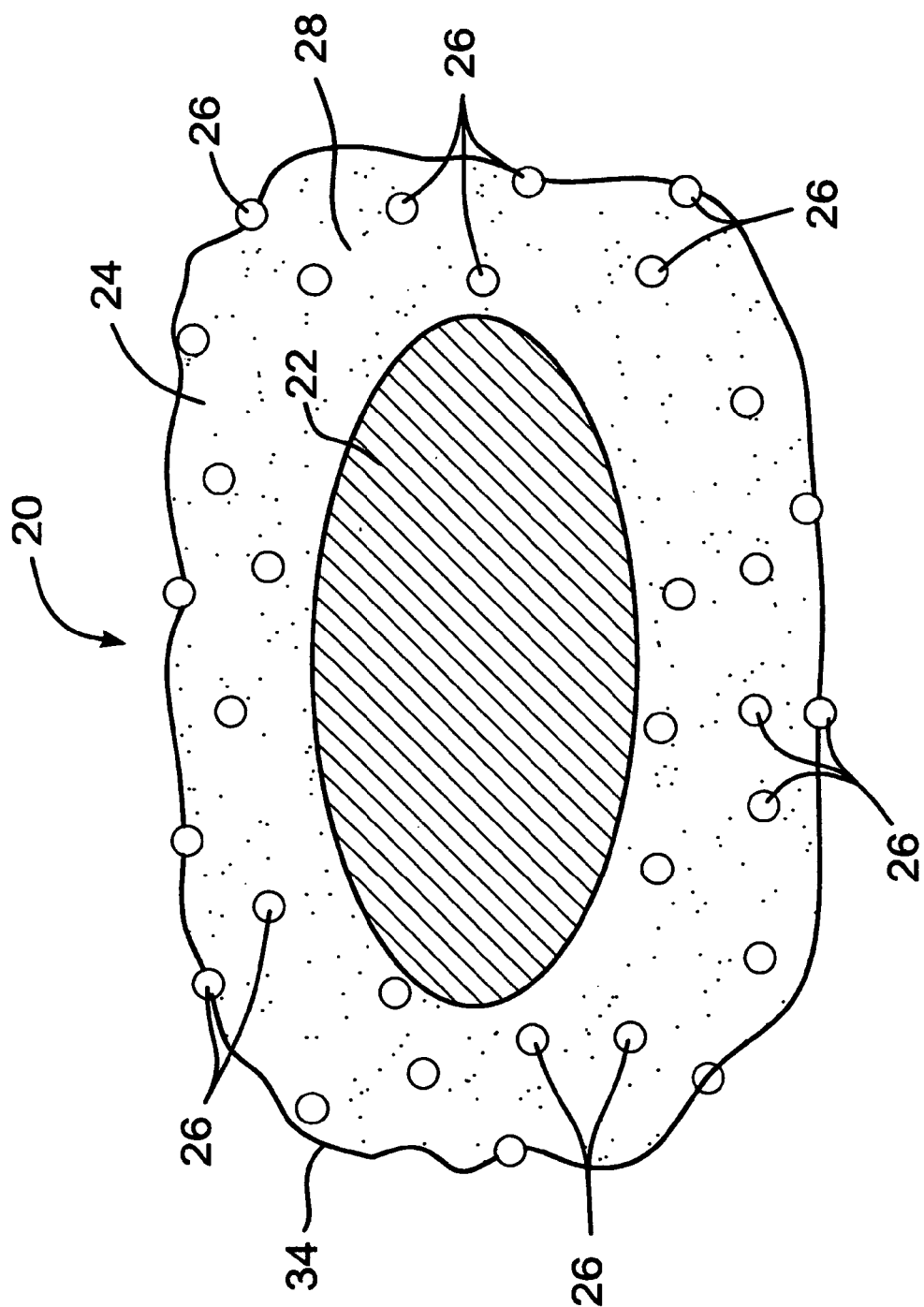
FIG. 1 is a schematic cut-away side view of a vector of the present invention having a plurality of plant seed material throughout the vector.

Referring to FIG. 1, one embodiment of a vector 20 of the present invention is schematically depicted. The vector 20 preferably comprises a core material 22, a fine-grained material 24 and plant seed material 26. By way of example only, the size of the vector 20 may vary between approximately 0.25 inches to approximately 3.25 inches in diameter, with approximately $3/8^{th}$ of an inch in diameter being a preferred size of the vector 20.

The core material 22 may be comprised of one or more earthen materials, biological materials or manmade materials. The following are examples of earthen materials, biological material and manmade materials which may be used with the present invention. Those skilled in the art will appreciate that other materials which are not specifically listed but which are equivalent to the following are within the scope of the present invention.

By way of example only, the earthen materials may be limestone, granite, slate and/or quartz stone, or gravel. The earthen materials may also be perlite, vermiculite and/or ore, such as iron ore.

The biological materials may be such as, by way of example only, nutshells, nut husks and/or nut cones, wood, seashells, and/or corncobs. Manmade materials that may comprise the core material include, but are not limited to, activated carbon, coke breeze, slag, fertilizer pellets, rubber tire pieces or chips, crushed glass, ceramic beads, crushed and fired clay and/or taconite.

The density of the core materials 22 can vary from less than 1 gram per cubic centimeter for core materials 22 such as nutshells to almost 3 grams per cubic centimeter for core materials 22 such as iron ore.

The core material 22 of the present invention is not limited to any specific shape and may be, by way of example only, spherical, oblong, sub-angular, angular and/or plate-like. The surface texture of the core material 22 may be smooth, rough, porous and/or non-porous. Regarding porosity, the core material 22 may range from relatively non-porous to relatively porous. Relatively non-porous for the purposes of the present invention means the core material 22 has pore space of less than 10 percent by volume. Relatively porous for the purposes of the present invention means the core material 22 has pore space less than 50 percent by volume.

Core materials 22 having a uniform size, referred to as poorly graded core materials, may be used as well as core materials 22 having a mix of sizes, referred to as well graded. Combinations of poorly graded core materials 22 and well-graded core materials 22 are well within the scope of the present invention.

The core material 22 may be composed of inorganic material and/or organic material. By way of example only, inorganic material may include oxygen, silica, aluminum, iron, magnesium and/or calcium. The organic material may be, by way of example only, compounds of carbon, oxygen, hydrogen, phosphorous and/or sulfur. Those skilled in the art will appreciate the present invention is not limited to the above-listed organic and inorganic materials but may also include other materials.

Continuing to refer to FIG. 1, an embodiment of the fine-grained material 24 is depicted about the core material 22. The fine-grained material 24 surrounds the core material 22 at least partially, and in the preferred embodiment, the fine-grained material 24 completely surrounds the core material 22. The fine-grained material 24 may be comprised of clay, silt and/or sand sized material including aluminosilicate materials (including phyllosilicates), carbonates, sulfides, zeolite, oxides, hydroxides or oxyhydroxides, non-crystalline materials, quartz, other rock-forming primarily materials, relatively inert bulking agents and/or organic materials. Preferably, the fine-grained material 24 is readily able to absorb water and swell.

The fine-grained material 24 may also comprise growth constituents beneficial to plants and which support germination. The growth constituents may comprise, but are not limited to, macronutrients, micronutrients, and/or fertilizers. Those skilled in the art appreciate that macronutrients are generally defined as plant nutrients that are present in plant biomass in relatively high concentrations. Macronutrients include carbon, hydrogen, oxygen, nitrogen, phosphorous, potassium, calcium, magnesium, and sulfur. The latter six are typically referred to as "soil-derived" macronutrients.

Micronutrients, also know as trace elements or minor elements, are generally defined as plant nutrients that are present in plant biomass in relatively low concentrations. Micronutrients are generally recognized to include iron, zinc, copper, manganese, molybdenum, nickel, boron, and chlorine.

A fertilizer is generally defined as any material that is added to supply plant nutrients. The fertilizer may be organic (natural) or chemical (manufactured).

The fine-grained material 24 preferably also includes one or more materials to make the vector 20 unappealing to animals to reduce foraging, predation, or herbivory of the plant seed material 26. Materials which may be added to the vector 20 to make it unappealing to animals include, but are not limited to: esters of anthranilic acid, esters of phenylacetic acid, dimethyl benzyl carbinyl acetate, dimethyl anthranilate, methyl anthranilate, blood meal, mammal urine, and/or other commercially available powdered and/or liquid deterrents.

A binder material 28 may be used to promote adhesion of the fine-grained material 24 to the core material 22 at least temporarily. The binder material 28 may be such as, by way of example only, polymers incorporated in variable quantities in either liquid or dry form. The binder material 28 may also comprise, again by way of example, cellulosic polymer, guar gum, water, glues, lignites, starch grafted polyacrylates, soy bean oil lecithins and mixtures thereof.

Figure 2:
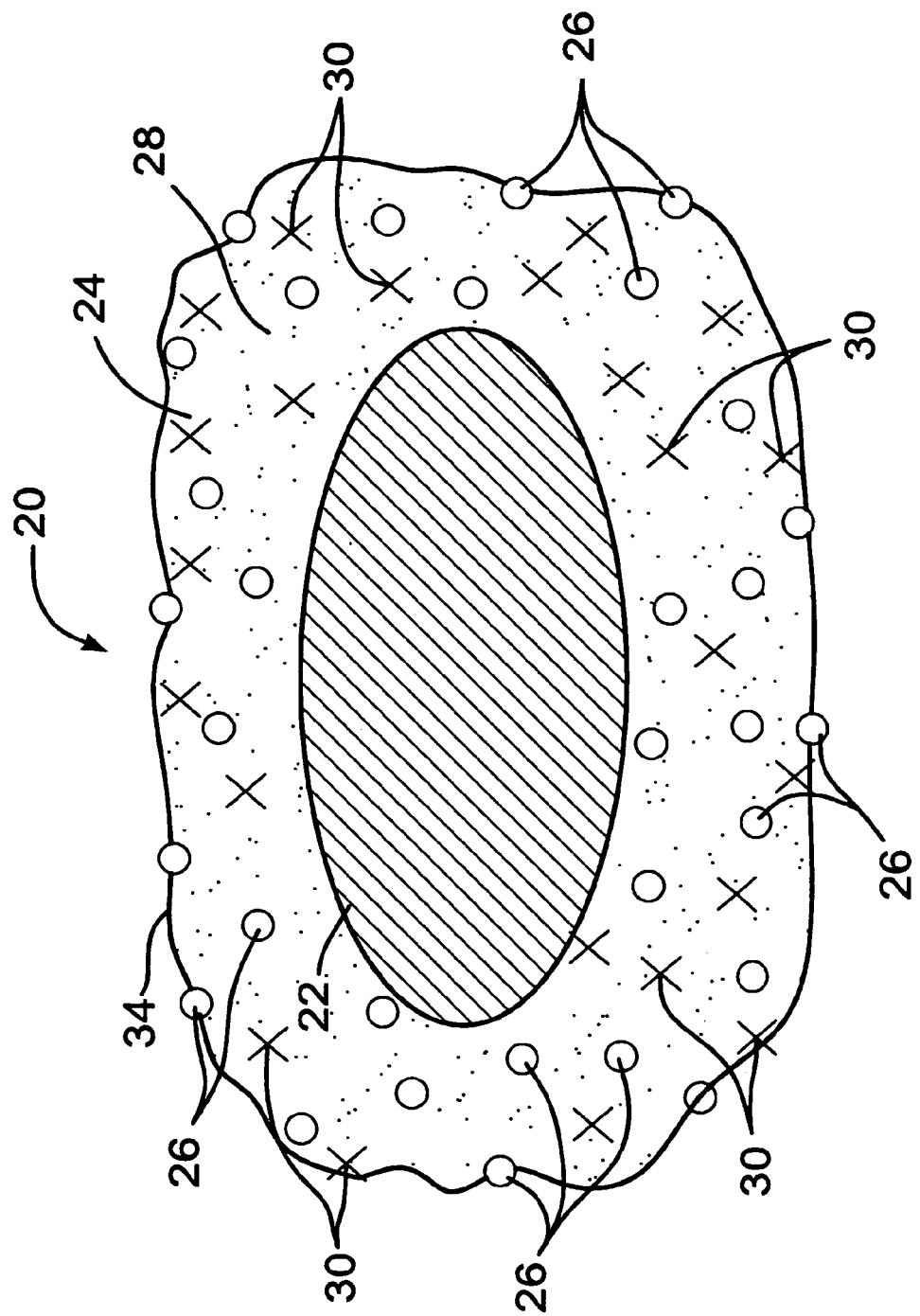
FIG. 2 is a schematic cut-away side view of yet another vector of the present invention having plant seed material from two plant species.
Figure 3:
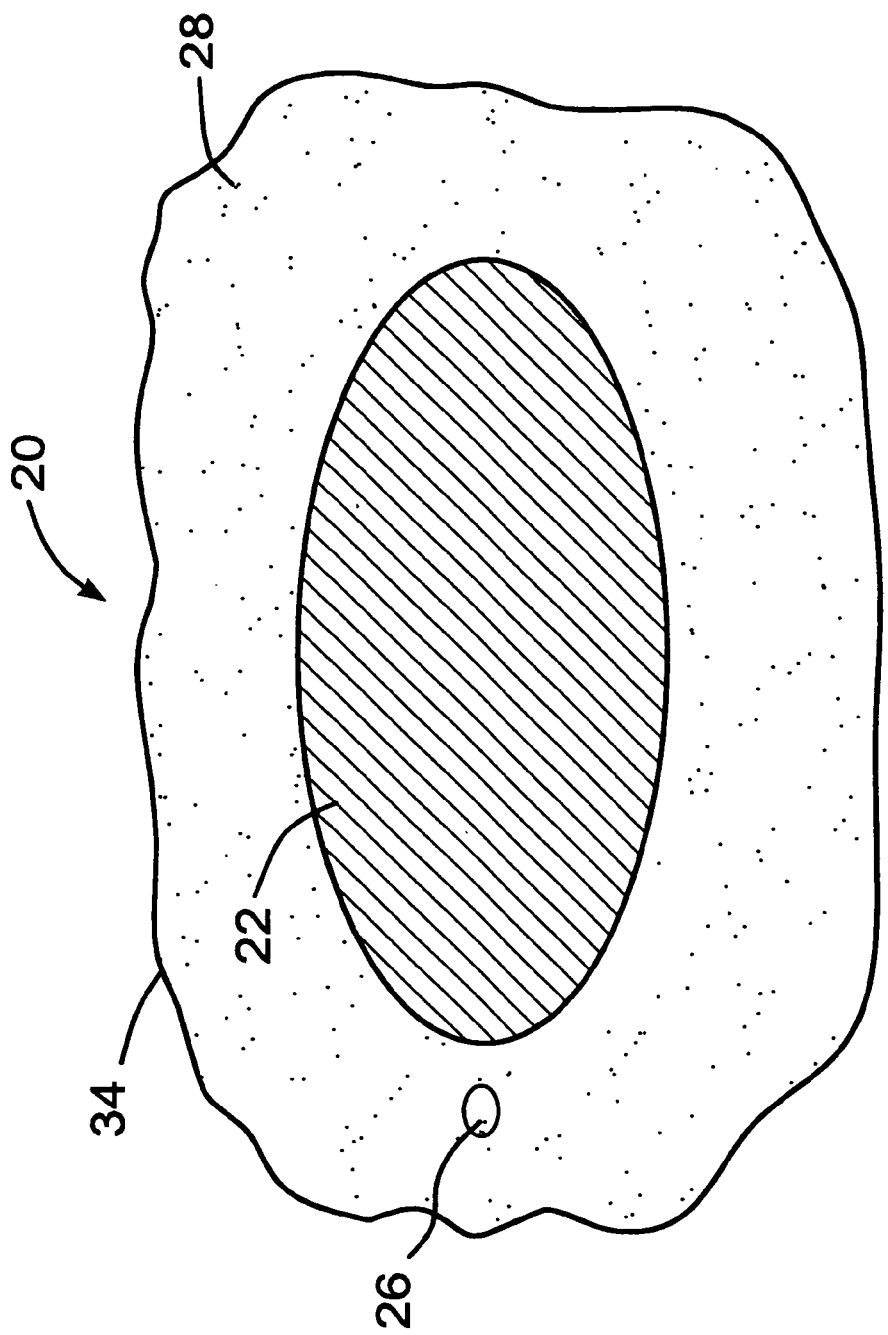
FIG. 3 is a schematic cut-away side view of yet another vector of the present invention having a single plant seed material.

The vector 20 may also comprise one or more plant seed materials 26 from one or more plant species. By way of example only, where more than one plant seed is included with the vector 20, as shown in FIG. 1, typically 2 to approximately 50 seeds will be located on the vector 20. In a preferred embodiment of such a vector 20, 2 to approximately 10 seeds will be located on the vector 20. FIG. 2 depicts a vector 20 having the aforementioned plant seed material 26 and a second type of plant seed material 30 on and in the fine-grained material 24. The invention also comprises a single piece of plant seed material 26 on the vector 20, as depicted in FIG. 3. Reference number 26 will be used to genericly represent all plant seed material, unless specified otherwise.

Regardless of the number or type of plant seed material 26 included with the vector 20, the plant seed material 26 can be entrained within the fine-grained material 24 and/or at least partially located on an outer surface 34 of the fine-grained material 24. It is preferred that the core material 22 have little or no plant seed material 26 therein. Instead, the plant seed material 26 is located outwardly from said core material 22.

The plant seed material 26 may comprise sexually reproductive structures, asexually reproductive structures or a combination of sexually reproductive structures and asexually reproductive structures. Those skilled in the art will appreciate that sexual reproduction in plants is the process by which a new individual plant is created through the union of specialized cells, called gametes. Sexual structures which house the gametes are often collectively called "fruits." Fruits are categorized in many ways based on the source from which they come, but they are often subdivided according to their physical structure and reproductive characteristics. The following are examples of types of reproductive fruits within the scope of the present invention: achene, caryopsis, cypsela, mericarp, nutlet, samara, capsule, follicle, pod, berry, and drupe.

Asexual reproduction in plants, also known as vegetative regeneration or cloning, may be defined as the numerical increase in plant units by clonal means. Genetically identical offspring arise from a variety of parental clonal structures that may include by way of example: turions, dormant apices, pseudoviviparous buds, or gemmiparous buds; layers, runners, stolons, rhizomes, or stem tubers; bulbs or corms; or creeping roots, tap roots, or root tubers.

A seed, for purposes of the present invention, is a single reproductive structure from either a forb, graminoid, shrub, or tree. Those skilled in the art appreciate that a forb is a vascular plant without significant woody tissue above or at the ground. Forbs may be annual, biennial, or perennial, but lack significant thickening by secondary woody growth and have perennating buds borne at or below the ground surface. Forbs also typically have relatively broad and pinnately-veined leaves.

A graminoid is defined as a grass or grass-like plant, including grasses (Poaceae), sedges (Cyperaceae), rushes (Juncaceae), arrow-grasses (Juncaginaceae), and quillworts (Isoetes). Graminoids typically have relatively narrow and parallel-veined leaves.

A shrub is a perennial, multi-stemmed woody plant that is usually less than 13 to 16 feet in height. Shrubs typically have several stems arising from or near the ground, but may be taller than 16 feet or single-stemmed under certain environmental conditions.

A tree is a perennial, woody plant with a single stem (trunk), normally greater than 13 to 16 feet in height. Under certain environmental conditions, some tree species may develop a multi-stemmed or short growth form (less than 13 feet in height).

The plant seed material 26 may comprise an aquatic submerged or floating leaved plant species, an aquatic or hydrophytic emergent plant species or a terrestrial plant species.

An aquatic submerged plant species includes plants that typically spend their entire life cycle-beneath the water surface (with the exception of flowering parts in some species). By way of example only, such species may include, but the present invention is in no way limited to: *Vallisneria americana* (water celery); Ceratophyllaceae (hornworts), Haloragaceae (water milfoils), Hydrocharitaceae (frogbits), and Potamogetonaceae (pondweeds).

Floating-leaved plant species include plants that root in a substrate under water but that extend a majority of their leaves to lie buoyantly on the surface of the water during adult stages of development. By way of example only, such species may include, but the present invention is in no way limited to: *Brasenia schreberi* (water shield); Nymphaeaceae (water lilies); and Nelumbonaceae (water lotuses).

Hydrophytic plants of the present invention are defined as plants that have adapted mechanisms for survival in saturated or inundated soils or sediments characterized by chemically anaerobic conditions. Examples of such plants include but are not limited to cattails, bulrushes, and willows.

Emergent plant species of the present invention include plants with roots and a basal stem anchored below the water level, whose photosynthetic stems, leaves, and reproductive organs are aerial. Examples of emergent plant species which the present invention is in no way limited to include *Juncus effusus* (soft rush); Alismataceae (water plantains), Cyperaceae (sedges), Juncaceae (rushes), Poaceae (grasses), Polygonaceae (smartweeds), and Typhaceae (cattails).

Terrestrial plant species of the present invention comprise plants that have not adapted mechanisms for survival in saturated or inundated soils or sediments characterized by chemically anaerobic conditions. The term non-saturated generally refers to a condition wherein void spaces within the material comprising the target surface are only partially filled with water, with remaining void spaces filled with air.

Examples of terrestrial plant species which the present invention is in no way limited to include, *Liatris pycnostachya* (prairie blazing star), *Andropogon* spp. (blue stems), *Aster* spp. (asters), *Helianthus* spp. (sunflowers), *Ratibida* spp. (coneflowers), *Rudbeckia* spp. (susans), *Solidago* spp. (goldenrods).

The plant seed material 26 may be pre-treated, stratified or physically or chemically manipulated to break the natural dormancy of the material. Stratification is any treatment step that works to break the natural dormancy of the plant seed material 26 to increase the probability and/or the rate of germination. Physical methods include, but are not limited to, any or all of the following (individually or in conjunction with each other): days, weeks, or months of cold, dry storage; days, weeks or months of cold, moist storage; days, weeks or months of warm, moist storage followed by weeks or months in cold, moist storage; days, weeks or months of cold, moist storage followed by weeks or months of warm, moist storage followed by a second period (weeks or months) of cold, moist storage. Those skilled in the art will appreciate that plant seed material 26 storage for extended periods of time often takes place in a sterile media, such as sand or vermiculite.

Additional physical methods include scarification, wherein the seed coats are abraded using an abrasive surface, like sand paper, without creating a disturbance to the interior of the seed itself. Nicking or gouging the seed coat with a knife or edge to physically break the seed coat may also be used. Another physical method includes soaking the plant seed material in water and varying in temperature from just above the freezing point (e.g., 34 degrees Fahrenheit) to above the boiling point (~212 degrees Fahrenheit) for minutes, hours, days, weeks, or months to soften the exterior seed coat. The plant seed material 26 may also be frozen for hours, days, weeks, or months to break the natural dormancy.

Biological/chemical methods to break the natural dormancy of the plant seed material 26 can include, but are not limited to: exposing the plant seed material 26 to rhizobium inoculum (for nitrogen fixation) for minutes, hours, days, weeks, or months and soaking the plant seed material 26 in various concentrations of bleach or acidic solution (derived from gibberalic acid, comparable solvents, or natural peat moss) for minutes, hours, days, weeks, or months.

The plant seed material 26 may also be dormant, hard or not treated to break its natural dormancy. Those skilled in the art appreciate that dormant or hard plant seed material 26 is living seed that requires more time to germinate even under environmental conditions normally favorable for germination because the proper combination of conditions (i.e., moisture, light, temperature, etc.) have not overcome the mechanical or hormonal restrictions to allow for the onset of germination. Especially when the plant seed material 26 has not been exposed to any of the stratification protocols described above (i.e., when the plant seed material 26 is freshly collected), it is not uncommon for a relatively high percentage (e.g., approximately 80 percent) of the plant seed material 26 to be dormant or hard.

The present invention also includes vectors 20 comprising a blend of plant seed material 26 which has been pre-treated, stratified or physically or chemically manipulated to break the natural dormancy with plant seed material 26 that is dormant, hard or has not been treated to break the natural dormancy. By way of example, 50 percent of the plant seed material 26 incorporated into the vectors 20 (by dry weight) may be stratified by one or more of the protocols described above while the balance (50 percent, by dry weight) of the incorporated plant seed material 26 would be non-stratified (with a higher percentage of dormant and/or hard seed). The percentages could be adapted such that the incorporation is any ratio (e.g., 75:25, meaning 75 percent is stratified and 25 percent is non-stratified—by dry weight).

One or more of the above-described vectors 20 are delivered to a target placement surface. The target placement surface may comprise one or more of the following: an inundated target placement surface 34, a saturated target placement surface 36 and/or a non-saturated target placement surface 38. Embodiments of the surfaces 34, 36, 38 are schematically depicted in FIGS. 4, 5, 6 and 7 which are discussed in greater detail below.

An inundated target placement surface 34 comprises areas periodically or permanently inundated by flowing or non-flowing surface waters characterized by freshwater, brackish, or saline conditions. Such areas would also typically be characterized as having surface waters present at depths capable of supporting hydrophytic plants, including emergent and/or submerged plant species.

The maximum depth of surface waters capable of supporting emergent or submerged plant growth is generally recognized to be approximately two meters (i.e., approximately 6.6 feet); however, rooted plant life can be supported in deeper water if water clarity allows for adequate light penetration.

Hydrogeomorphic examples of inundated target placement surfaces 34 would generally include: deltas, estuaries, lakes, rivers, streams, including intermittent streams and perennial streams, creeks, ditches, diked areas, lagoons, both natural and manmade, marshes, oxbows, ponds, both natural and manmade, sloughs, subtidal areas and swamps.

Examples of surfaces of inundated target placement surfaces 34 include, but are not limited to: sediment and soil, specifically hydric soil.

Those skilled in the art know that the divisions between freshwater conditions, brackish conditions and saline conditions, particularly between brackish and saline conditions, are not easy to distinguish quantitatively. For the purposes of the present invention, freshwater can be defined as water without salt in it, like ponds and streams. Brackish water can be defined as water that contains some salt, but less than seawater; a mixture of fresh and saltwater typically found in estuarine areas. Saline water is water that is considered generally unsuitable for human consumption or for irrigation because of its high content of dissolved solids. The content of dissolved solids in water is generally expressed as milligrams per liter (mg/L). Seawater, for example, is generally considered to contain approximately 35,000 mg/L of dissolved solids.

A saturated target placement surface 36 comprises areas periodically or permanently saturated with waters characterized by freshwater, brackish, or saline conditions. Such areas would also typically be characterized as having saturated conditions present that are capable of supporting hydrophytic plants, including emergent plant species but typically excluding submerged species. The term saturated generally refers to a condition wherein all void spaces within the material comprising the target surface are completely filled with water.

Hydrogeomorphic examples of saturated target placement surfaces 36 include, but are not limited to: bottomlands, floodplains, intertidal areas, mudflats, playas, riparian areas, swales, tidal flats, vernal ponds, vernal pools, wet meadows and wet prairies.

Surfaces beneath saturated target placement surfaces 36 include, but are not limited to sediment and soil, specifically hydric soil.

A non-saturated target placement surface 38 comprises permanently non-inundated areas characterized by predominantly or permanently non-saturated conditions. Such areas would also typically be characterized as having non-saturated conditions present that are capable of supporting mesophytic and/or xerophytic plants.

Geomorphic examples of non-saturated target placement surfaces 38 include but are not limited to uplands and terrestrial areas. Examples of surfaces of non-saturated target placement surfaces 38 include soil, specifically non-hydric soil.

The plant seed material 26 can be distributed in a predetermined pattern, a predetermined quantity, a predetermined location and/or a predetermined blend of plant species via the vectors 20 over a target placement surface 34, 36, 38. For example, the plant seed material 26 can be spatially distributed on the target placement surface 34, 36, 38 by manipulating the quantity and/or kind of the plant seed material 26 on a single vector 20, manipulating the spacing of the vectors 20, and/or manipulating the number of individual vectors 20 placed over the target placement surface 34, 36, 38.

Various distribution methods may be used to scatter the vector 20 across a target placement surface 34, 36, 38. By way of example only, broadcasters and/or tow-behind spreaders may be used. The vectors 20 may be manually distributed also, such as by tossing or throwing. The following provides a few exemplary embodiments of distributing the present invention over various target placement surfaces. Those skilled in the art will appreciate that other methods are readily adaptable to delivering vectors 20 to a target placement surface 34, 36, 38 and such methods are intended to be within the scope of the present invention. Regardless of the method selected to deliver the vectors 20 over any target placement surface 34, 36, 38, in no situation are the vectors 20 delivered so as to form a barrier of any size, shape or thickness over any surface 34, 36, 38.

Figure 4:
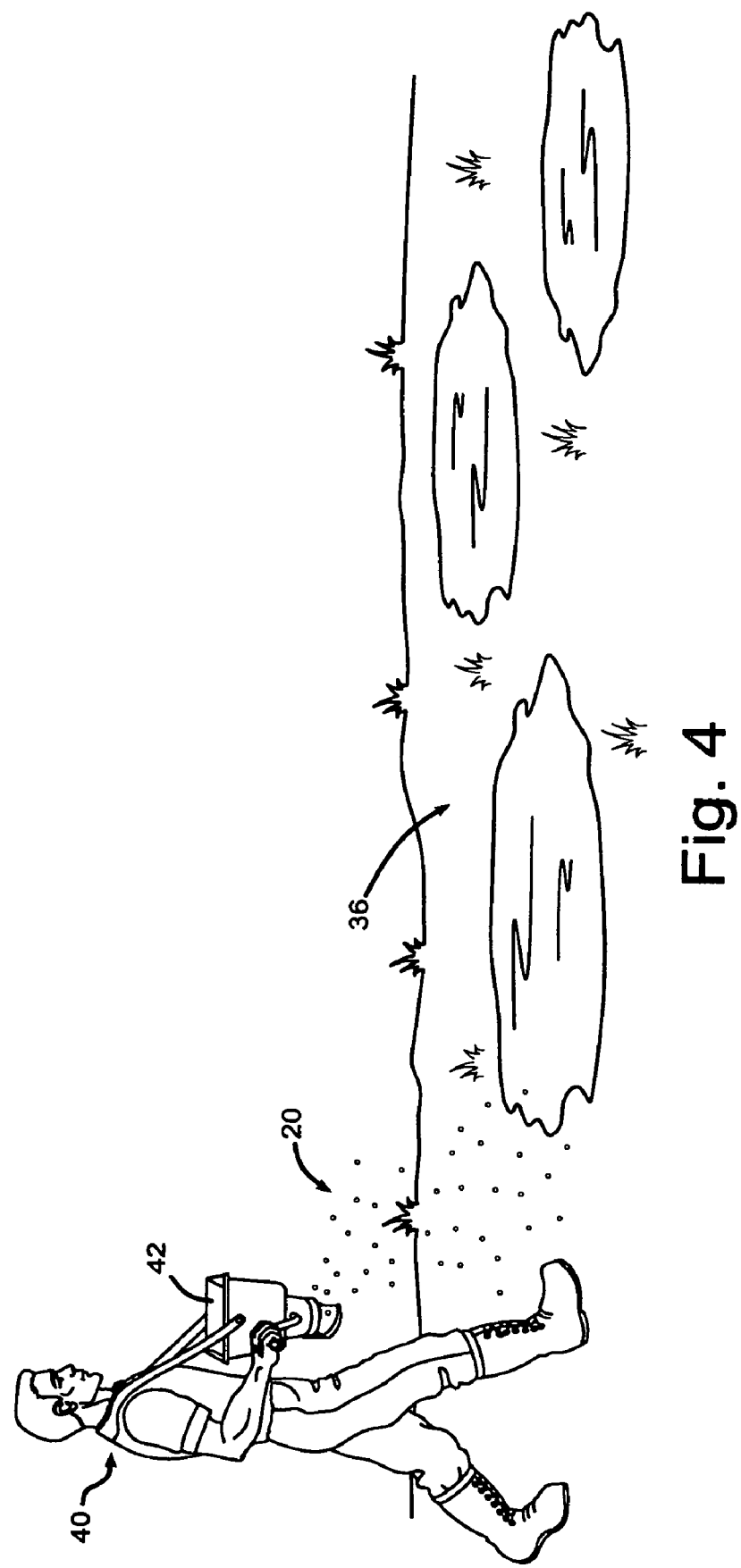
FIG. 4 is a schematic view of a plurality of vectors being delivered by one method to a saturated target placement surface.
Figure 5:
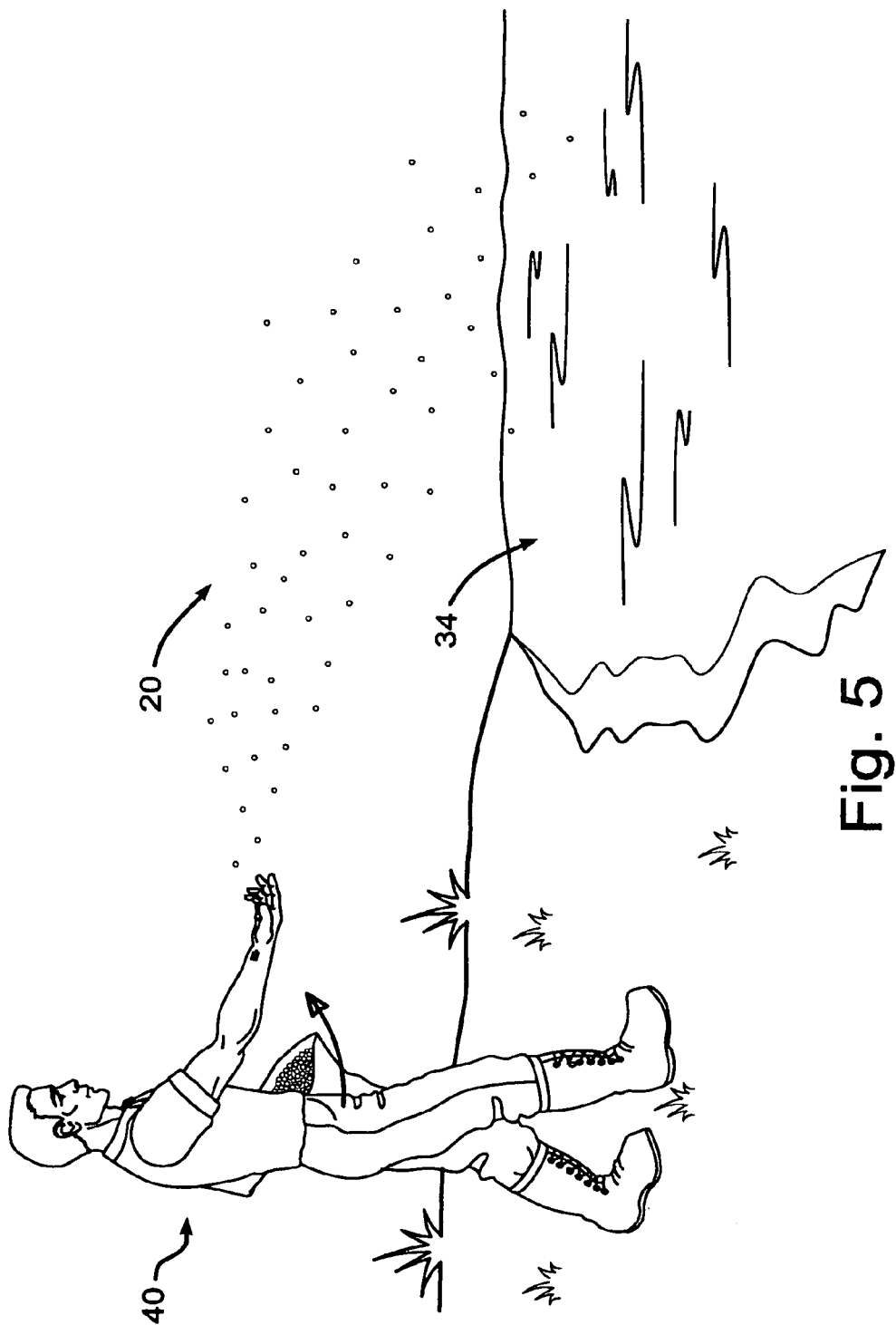
FIG. 5 is a schematic view of a plurality of vectors being delivered by yet another method to an inundated target placement surface.
Figure 6:
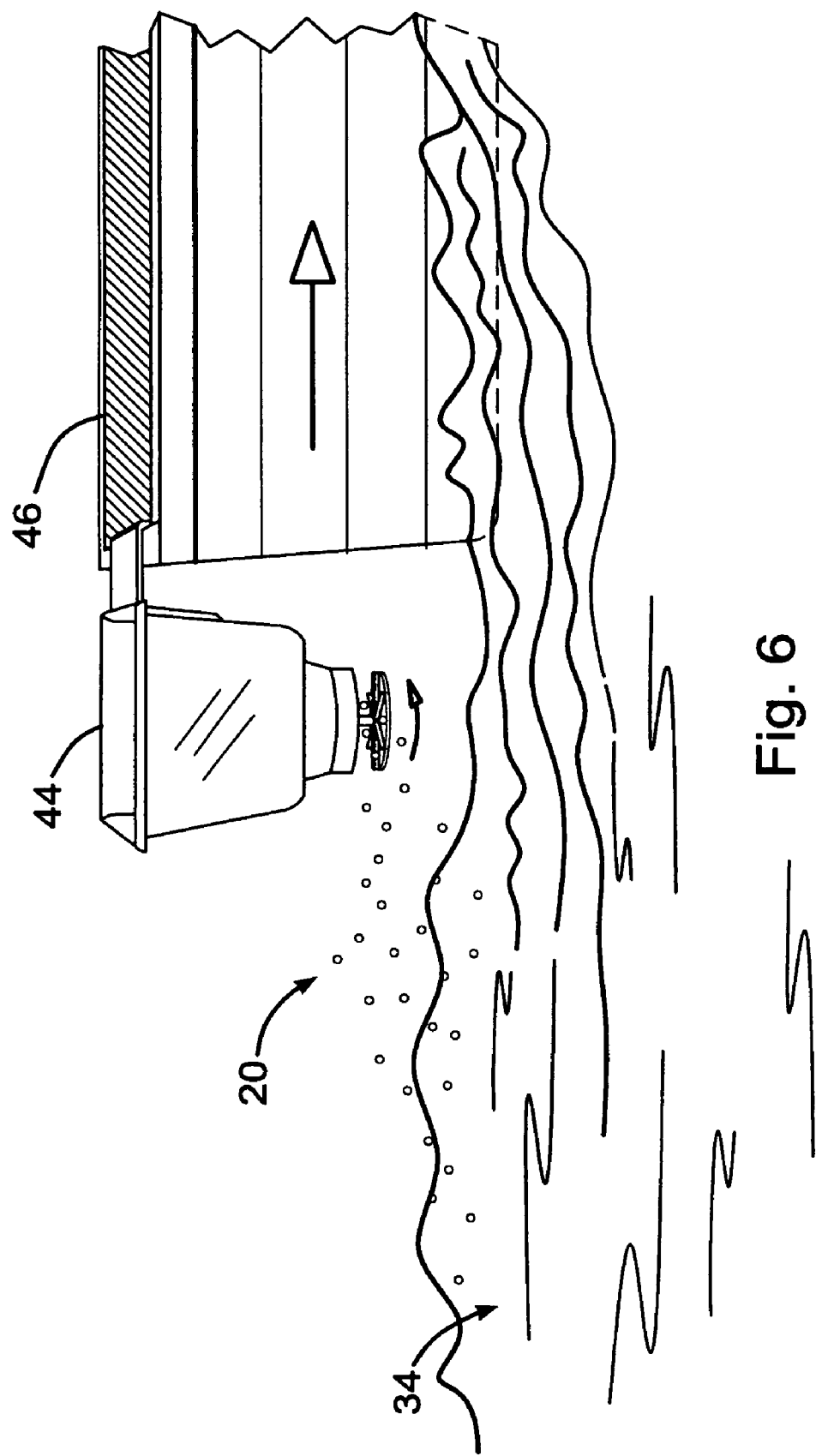
FIG. 6 is a schematic view of a plurality of vectors being delivered by yet another method to an inundated target placement surface.
Figure 7:
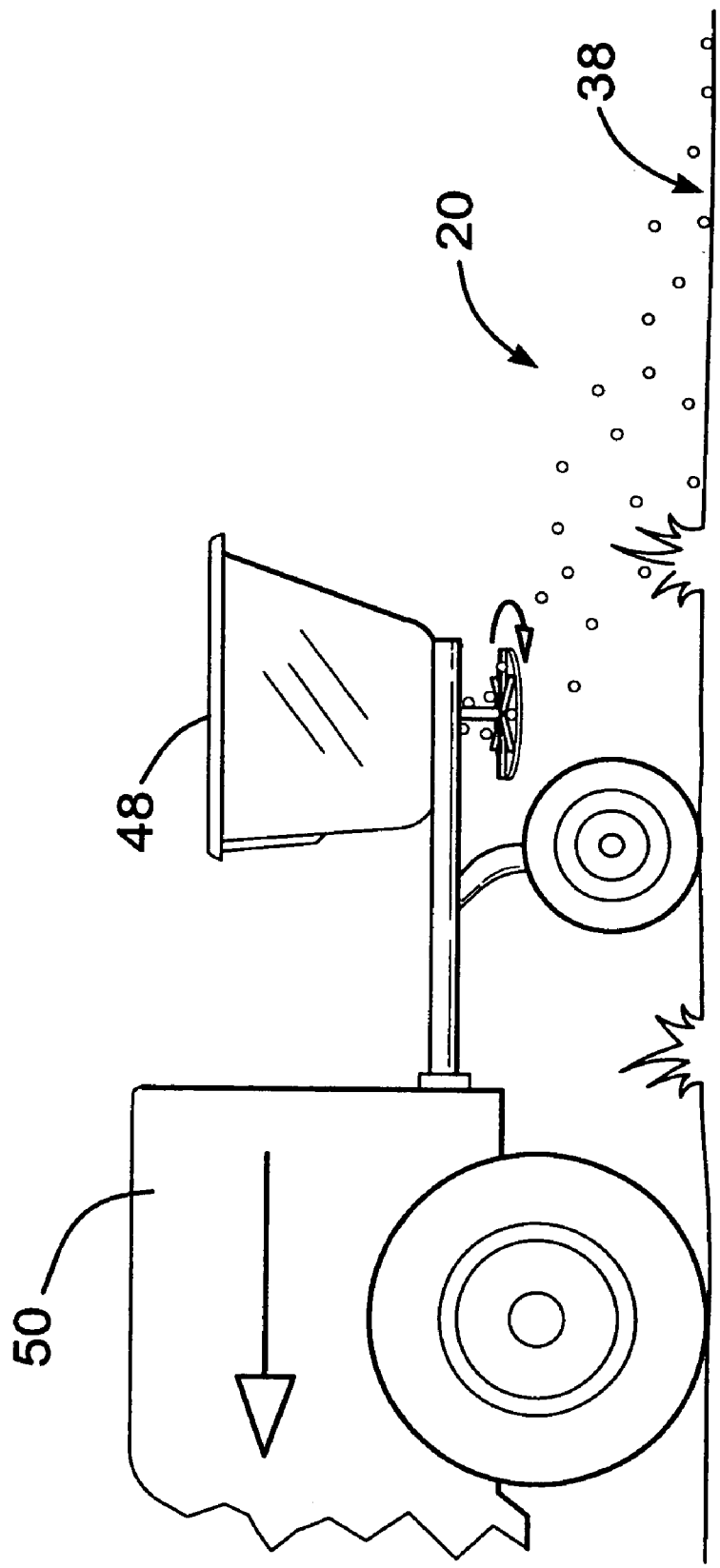
FIG. 7 is a schematic view of a plurality of vectors being delivered by yet another method to a non-saturated target placement surface.
Figure 8:
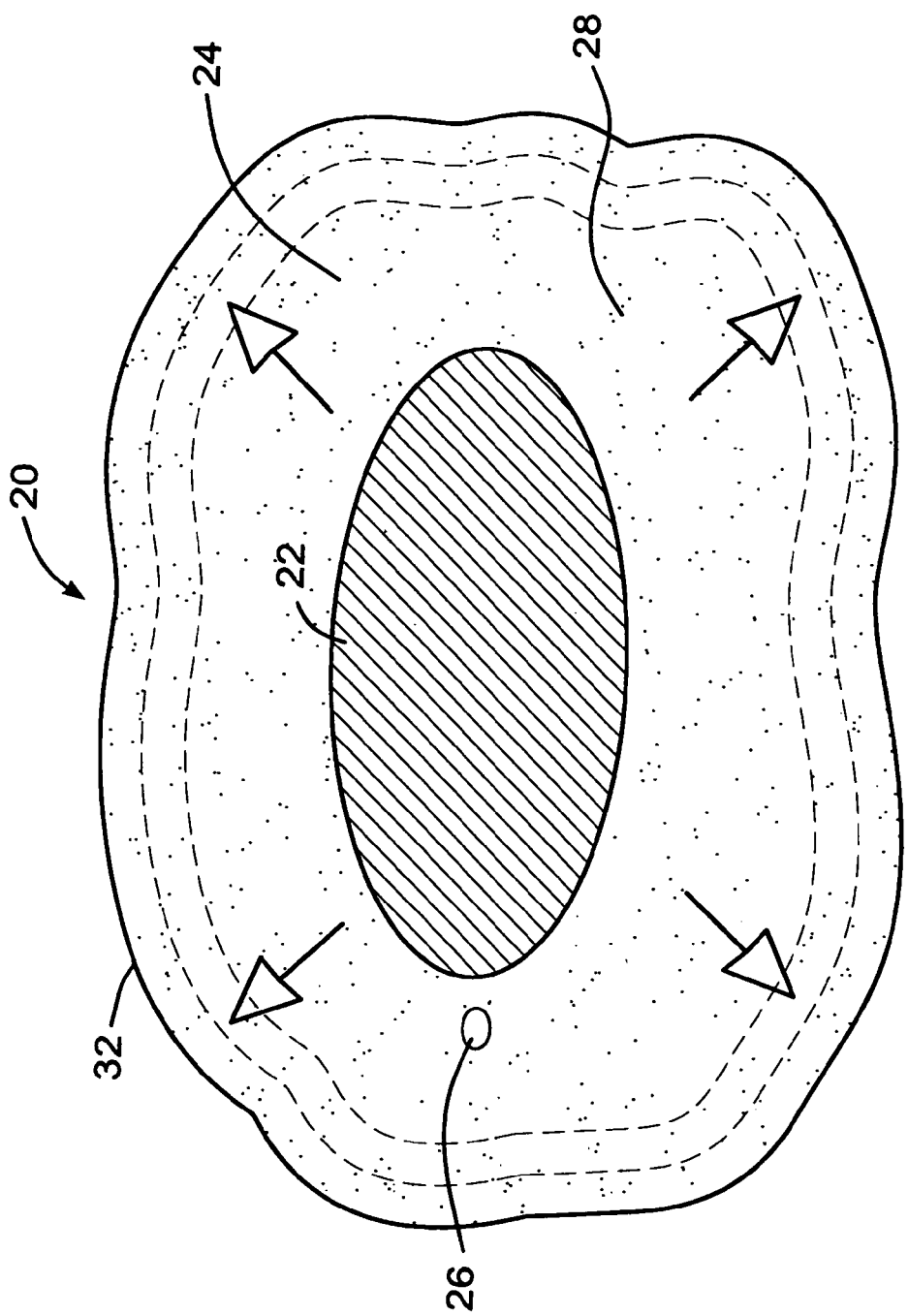
FIG. 8 is a schematic cut away side view of a vector where the vector has been expanded by moisture.
Figure 9:
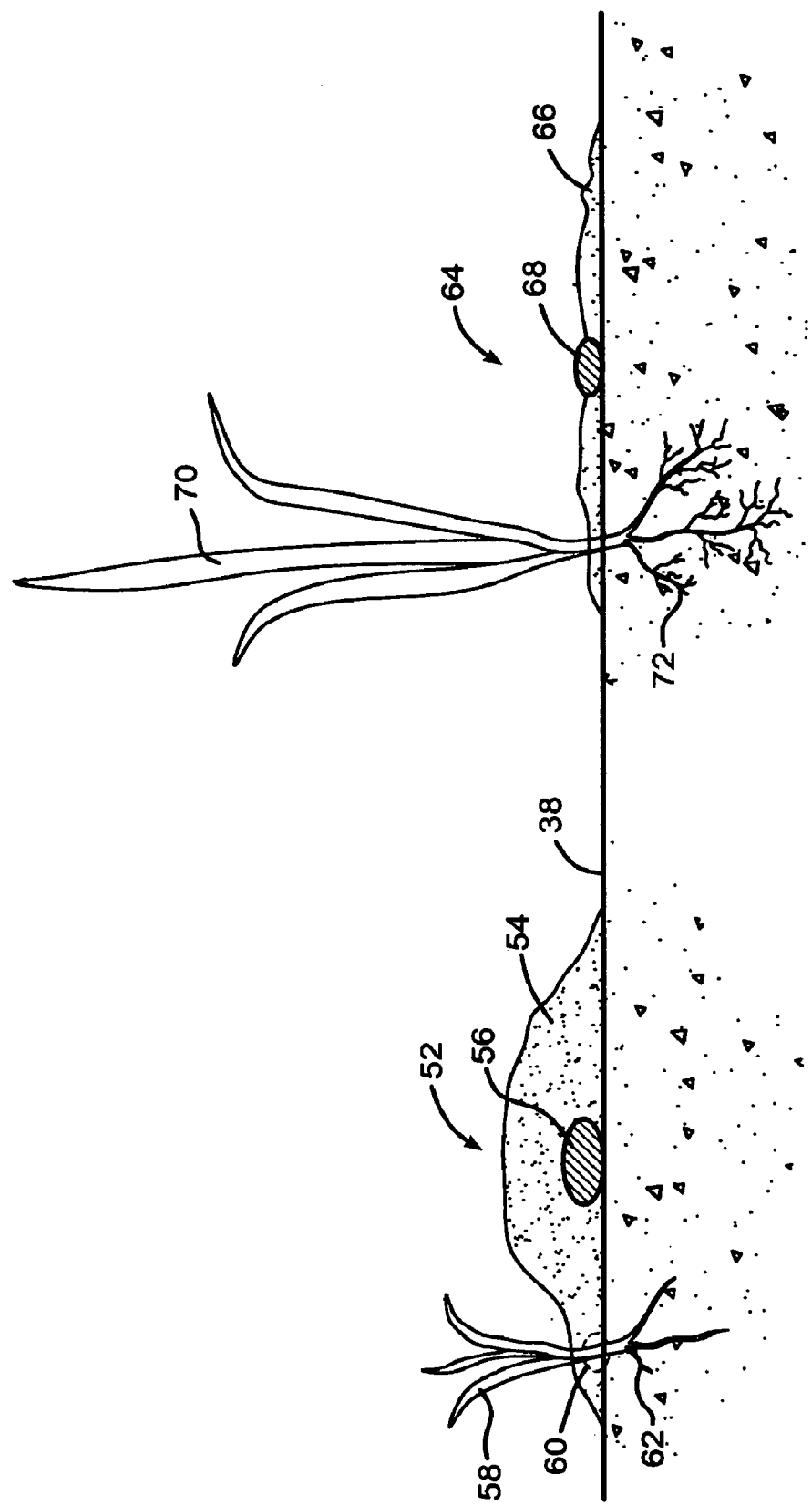
FIG. 9 is a schematic view of two vectors on a target placement surface where two plants have resulted therefrom.

FIG. 4 depicts a person 40 using one embodiment of a carry-along, manually operated broadcaster 42 over a saturated target placement surface 36 to distribute the vectors 20. FIG. 5 depicts a person 40 manually distributing the vectors 20 to an inundated target placement surface 34 such as by tossing, throwing or otherwise scattering. FIG. 6 also depicts an inundated target placement surface 34 where a broadcaster 44 is attached to a boat 46 to deliver vectors 20 to an area out of the range of a tossing or throwing technique. FIG. 7 depicts the use of a spreader 48 towed behind a vehicle 50, such as a tractor, where the spreader 48 is used to distribute vectors 20 over a non-saturated target placement surface 38. Those skilled in the art appreciate that the various methods of distributing vectors 20 described above and depicted in the figures are exemplary embodiments.

As mentioned above and as depicted in the Figures, the vectors 20 can be distributed over water. The core material 22 of each vector 20, and the vector itself, has a density greater than the density of freshwater, the density of brackish water or the density of full saline water so that the vector 20 readily sinks to the bottom of any body of water. Once at the bottom of a body of water, the core material 22 has sufficient mass to keep the vector 20 in place. The mass of the core material 22 also assists the vector 20 in maintaining its position in saturated environments and non-saturated environments.

Regardless of the method used to distribute any number of vectors 20 over any target placement surface 34, 36, 38, it is a requirement of the present invention that a barrier of vectors is not formed over the target placement surface 34, 36, 38. Preferably, once the vectors 20 come to rest on the target placement surface 34, 36, 38, their numbers are so few that they do not come in contact with one another. In one embodiment, by way of example only, is it preferred that there are less than 50 vectors 20 per square foot delivered to a target placement surface 34, 36, 38. In another exemplary embodiment, the vectors 20 cover less than approximately 20 percent of the target placement surface 34, 36, 38.

Utilizing any of the above-described distribution methods, the quantity of plant seed material 26 spatially distributed on any target placement surface 34, 36, 38 may be varied by manipulating the number of individual vectors 20 placed on the target placement surface 34, 36, 38. The plant seed material 26 may also be spatially distributed using any of the above-described distribution methods and varying the spacing between the individual vectors 20.

Mixtures of vectors 20 carrying plant seed material 26 of various species of plants may also be created and distributed over different target placement surfaces 34, 36, 38, by any known means.

The vector 20 resides on the target placement surface 34, 36, 38 in its delivered state until it encounters water. Water, regardless of its salt content, causes the fine-grained material 24 to assume a sticky condition. The sticky condition assists the vector 20 in maintaining its placed position on the target placement surface 34, 36, 38 by allowing the vector 20 to stick, or adhere, to the target placement surface 34, 36, 38. Of course, if the vector 20 is introduced into a submerged or inundated target placement surface 34 the vector 20 does not need to wait until it rains, such as on a non-saturated target placement surface 38, until it reaches the sticky condition.

Water also causes the fine-grained material 24 on the vector 20 to expand as schematically depicted in FIG. 8. Expansion of the fine-grained material 24 exposes plant seed material 26 entrained within the fine-grained material 24 to sunlight and/or locates the plant seed material 26 in contact with a resting surface on the target placement surface 34, 36, 38. Those skilled in the art appreciate that sunlight is an important element in germination. A resting surface may be, by way of example only, the bottom of a pond.

After a period of time of being exposed to water that ranges from several minutes to several days, the fine-grained material 24 begins to disassociate from the core material 22. FIG. 9 depicts a first vector 52 where its fine-grained material 54 has begun to disassociate from the core material 56. A plant 58 has germinated from the plant seed material 60 (shown as a dashed line). The disassociated fine-grained material 54 may be used by the plant seed material 60 as a base for securing plant roots 62 therein, thus supporting germination. Preferably, the roots 62 eventually penetrate the target placement surface 38 itself and secure themselves thereto. Additionally, the fine-grained material 54, as mentioned above, can have growth constituents comprising macronutrients, micronutrients and/or fertilizers to support the plant seed material 60 during germination and/or subsequent growth. As mentioned above, the exemplary plant 58 depicted in the figures may be an aquatic submerged or floating leaved plant, an aquatic or hydrophytic emergent plant or a terrestrial plant.

Over time, the fine-grained material substantially completely disassociates from the core material 22. A second vector 64 can be seen in FIG. 9 where its fine-grained material 66 has substantially disassociated from the core material 68. A plant 70 has germinated from the plant seed material (not shown) of this vector 64. The roots 72 of the plant 70 have fully developed into the target placement surface 38.

By way of example, if the vector 20 is located on a non-saturated target placement surface 38, environmental conditions such as wind and rain, can contribute to the disassociation of the fine-grained material 24 from the core material 22. If the vector 20 is located on a saturated target placement surface 36, wind and rain as well as perhaps periodic water currents can contribute to the disassociation. As yet another example, water currents can contribute to the disassociation of the fine-grained material 24 in inundated target placement surfaces 34.

Those skilled in the art will appreciate that the ability to accurately deliver plant seed material in a particular quantity to particular target placement surfaces increases the probability that at least a portion of the plant seed material will germinate and develop into mature plants.

As seen in FIG. 9, a non-saturated target placement surface 38 is depicted where the two separate vectors 52, 64 have been located. Two separate plants 58, 70 have germinated and grown where the vectors 52, 64 were placed. The plants 58, 70 are spaced apart from one another such that the roots 62, 74 of either plant 58, 70 do not contact one another. FIG. 9 depicts a preferred embodiment of the present invention wherein the plants 58, 70 do not contact one another and a barrier has not been formed over the target placement surface 38, thus permitting the target placement surface 38 to be substantially exposed to prevailing environmental conditions.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of delivering plant seed material to a target placement surface, comprising:

utilizing a core material comprised of one or more earthen, biological, or manmade materials;

combining plant seed material with said core material to utilize said core material as a vector for said plant seed material; and delivering a plurality of said vectors to a target placement surface but preventing said vectors from forming a barrier layer over said target placement surface;

wherein a vector mixture is created by mixing vectors carrying a specific type of plant seed material with vectors carrying at least one other type of plant seed material in a pre-determined ratio before said vectors are distributed over said target placement surface.

2. The method of claim 1, wherein said earthen, biological or manmade materials for said core material vary in density, shape, size, composition, surface texture, or porosity.

3. The method of claim 1, wherein said vectors facilitate placing said plant seed material in a predetermined pattern, a predetermined quantity, a predetermined location or placing a predetermined blend of plant species in an area.

4. A method of claim 1, wherein said plant seed material is spatially distributed on said target placement surface by manipulating the quantity of said plant seed material attached to a single vector.

5. A method of claim 1, wherein said plant seed material is spatially distributed on said target placement surface by manipulating the number of individual vectors placed over said target placement surface.

6. A method of claim 1, wherein said plant seed material is spatially distributed on said target placement surface by manipulating the spacing of said individual vectors that carry said plant seed material over said target placement surface.

7. The method of claim 1, wherein less than 50 vectors per square foot are delivered to said target placement surface.

8. The method of claim 1, wherein said vectors cover less than approximately 20 percent of said target placement surface.

9. The method of claim 1, wherein said vectors are scattered over said target placement surface and said vectors are not in contact with one another.

10. A method of claim 1, wherein said vectors are distributed with a hand-held broadcaster, a tow-behind spreader or manual distribution.

11. The method of claim 1, wherein each of said vectors further comprises a material located about said core.

12. The method of claim 11, wherein each of said vectors further comprises a binding agent which promotes adhesion of said material located about said core and said plant seed material to said core material.

13. A method of claim 11, wherein when said vector comes into contact with moisture, said material located about said core becomes sticky thereby anchoring said vector in place on said target placement surface.

14. A method of claim 11, wherein when said vector comes into contact with moisture, said material located about said core expands and exposes said plant seed material to light.

15. A method of claim 11, wherein said material located about said core supports germination of said plant seed material on said target placement surface.

16. A method of claim 11, wherein said material located about said core includes growth constituents comprising macronutrients, micronutrients, or fertilizers.

17. A method of claim 11, wherein said material located about said core comprises materials to make said vector unappealing to animals to reduce foraging, predation, or herbivory of said plant seed material.

18. The method of claim 11, wherein said vectors are scattered over said target placement surface at a predetermined coverage rate such that when said plant seed material germinates and resulting plants mature, the roots of said plants grow into said fine-grained material or said target placement surface but not into adjacent vectors.

19. The method of claim 11, wherein said material located about said core disassociates once said fine-grained material is exposed to water for a period of time.

20. The method of claim 19, wherein said period of time is at least several minutes to at most several hours.

21. The method of claim 1, wherein said core material has sufficient mass to anchor said vector to said target placement surface.

22. The method of claim 1, wherein said vector has a density greater than the density of freshwater, the density of brackish water or the density of full saline water so that said vector sinks in any type of water.

23. The method of claim 1, wherein an individual vector ranges in size from approximately 0.25 inches to 3.25 inches.

24. The method of claim 1, wherein said plant seed material is located outwardly from said core material so that said core material itself contains no plant seed material.

25. The method of claim 1, wherein said plant seed material includes either sexual reproductive structures, asexual reproductive structures or a combination of sexual reproductive structures and asexual reproductive structures.

26. A method of claim 1, wherein said plant seed material comprises a single plant seed on an individual vector.

27. A method of claim 1, wherein said plant seed material comprises multiple plant seeds on an individual vector.

28. A method of claim 1, wherein said plant seed material is one or more plant seeds associated with one or more plant species.

29. A method of claim 1, wherein said plant seed material is delivered to an inundated target placement surface by said vector.

30. A method of claim 1, wherein said plant seed material is delivered to a saturated target placement surface by said vector.

31. A method of claim 1, wherein said plant seed material is delivered to a non-saturated target placement surface by said vector.

32. A method of claim 1, wherein said plant seed material of an aquatic submerged or floating-leaved species is delivered by said vector.

33. A method of claim 1, wherein said plant seed material of a terrestrial or upland plant species is delivered by said vector.

34. A method of claim 1, wherein said plant seed material is delivered to a target placement surface that is in a freshwater, brackish, or full saline environment.

35. A method of claim 1, wherein said plant seed material that has been pre-treated, stratified, or physically or chemically manipulated to break natural dormancy and encourage germination of said plant seed material is delivered by said vector.

36. A method according to claim 1, wherein said plant seed material that is dormant, hard, or has not been treated to break the natural dormancy and encourage germination of said plant seed material is delivered by said vector.

37. A method of claim 1, wherein said vector delivers a blend of said plant seed material which has been pre-treated, stratified, or physically or chemically manipulated to break natural dormancy and encourage germination of said plant seed material in combination with plant seed material that is dormant, or has not been treated to break the natural dormancy of said plant seed material.

38. A method of delivering plant seed material to a target placement surface, comprising:
utilizing a core material comprised of one or more earthen, biological, or manmade materials that vary in density, shape, size, composition, surface texture or porosity;
utilizing a material located about said core to secure plant seed material to said core material to utilize said core material as a vector for said plant seed material;
utilizing at least one binding agent to promote adhesion of said fine-grained material to said core; and
scattering a predetermined number of said vectors across a target placement surface so as not to form a barrier of said vectors over said target placement surface and so that individual plants that grow from individual vectors are not in contact with one another on said target placement surface.

39. A method of claim 38, wherein said plant seed material is spatially distributed on said target placement surface by manipulating the quantity of said plant seed material attached to a single vector.

40. A method of claim 38, wherein said plant seed material is spatially distributed on said target placement surface by manipulating the number of individual vectors placed over said target placement surface.

41. A method of claim 38, wherein said plant seed material is spatially distributed on said target placement surface by manipulating the spacing of said individual vectors that carry said plant seed material over said target placement surface.

42. The method of claim 38, wherein said vectors cover less than approximately 20 percent of the total area of said target placement surface.

43. The method of claim 38, wherein said vectors are scattered over said target placement surface so that individual vectors do not contact one another.

44. A method of claim 38, wherein when said vector comes into contact with moisture, said material located about said core anchors said vector in place on said target placement surface.

45. A method of claim 38, wherein a vector mixture is created by mixing vectors carrying a specific type of said plant seed material with vectors carrying at least one other type of said plant seed material in a pre-determined ratio before said vectors are distributed over said target placement surface.

46. The method of claim 38, wherein said vectors are scattered over said target placement surface at a predetermined coverage rate such that when said plant seed material germinates and resulting plants mature, the roots of said plants grow into said fine-grained material and/or said target placement surface but not into adjacent vectors.

47. The method of claim 38, wherein said core has sufficient mass to anchor said vector to said target placement surface.

48. The method of claim 38, wherein said vector has a density greater than the density of freshwater, the density of brackish water or the density of full saline water so that said vector sinks in any type of water.

49. The method of claim 38, wherein an individual vector ranges in size from approximately 0.25 inches to 3.25 inches.

50. The method of claim 38, wherein said fine-grained material disassociates once said fine-grained material is exposed to water for a period of time.

51. The method of claim 50, wherein said period of time is at least several minutes to at most several hours.

52. The method of claim 38, wherein said plant seed material is located outwardly from said core so that said core itself contains no plant seed material.

53. A method of claim 38, wherein said plant seed material is a single plant seed on an individual vector.

54. A method of claim 38, wherein said plant seed material comprises multiple plant seeds on an individual vector.

55. A method of delivering plant seed material to a target placement surface, comprising:

utilizing a plurality of vectors each comprised of a core and a fine-grained material carrying plant seed material about said core;

scattering said vectors across a target placement surface so as not to form a barrier of vectors across said target placement surface; and disassociating said fine-grained material from said core with water on said target placement surface;

wherein a vector mixture is created by mixing vectors carrying a specific type of plant seed material with vectors carrying at least one other type of plant seed material in a pre-determined ratio before said vectors are distributed over said target placement surface.

56. A method of claim 55, wherein said plant seed material is spatially distributed on said target placement surface by manipulating the quantity of plant seed material attached to a single vector.

57. A method of claim 55, wherein said plant seed material is spatially distributed on said target placement surface by manipulating the number of individual vectors placed over said target placement surface.

58. A method of claim 55, wherein said plant seed material is spatially distributed on said target placement surface by manipulating the spacing of said individual vectors that carry said plant seed material over said target placement surface.

59. The method of claim 55, wherein said vectors cover less than approximately 20 percent of said target placement surface.

60. The method of claim 55, wherein said vectors are scattered over said target placement surface so that individual vectors do not contact one another.

61. A method of claim 55, wherein when said vector comes into contact with moisture, said relatively fine-grained material becomes sticky thereby anchoring said vector in place on said target placement surface.

62. A method of claim 55, wherein a vector mixture is created by mixing vectors carrying a specific type of plant seed material with vectors carrying at least one other type of plant seed material in a pre-determined ratio before said vectors are distributed over said target placement surface.

63. The method of claim 55, wherein said vectors are scattered over said target placement surface at a predetermined coverage rate such that when said plant seed material germinates and resulting plants mature, the roots of said plants grow into said fine-grained material and/or said target placement surface and not into adjacent vectors.

64. The method of claim 55, wherein said core has sufficient mass to anchor said vector to said target placement surface.

65. The method of claim 55, wherein said vector has a density greater than the density of freshwater, the density of brackish water or the density of full saline water so that said vector sinks in any type of water.

66. The method of claim 55, wherein an individual vectors ranges in size from approximately 0.25 inches to 3.25 inches.

67. The method of claim 55, wherein said plant seed material is located outwardly from said core so that said core itself contains no plant seed material.

68. A method of claim 55, wherein said plant seed material is a single plant seed on an individual vector.

69. A method of claim 55, wherein said plant seed material comprises multiple plant seeds on an individual vector.

* * * * *